Patented July 18, 1950

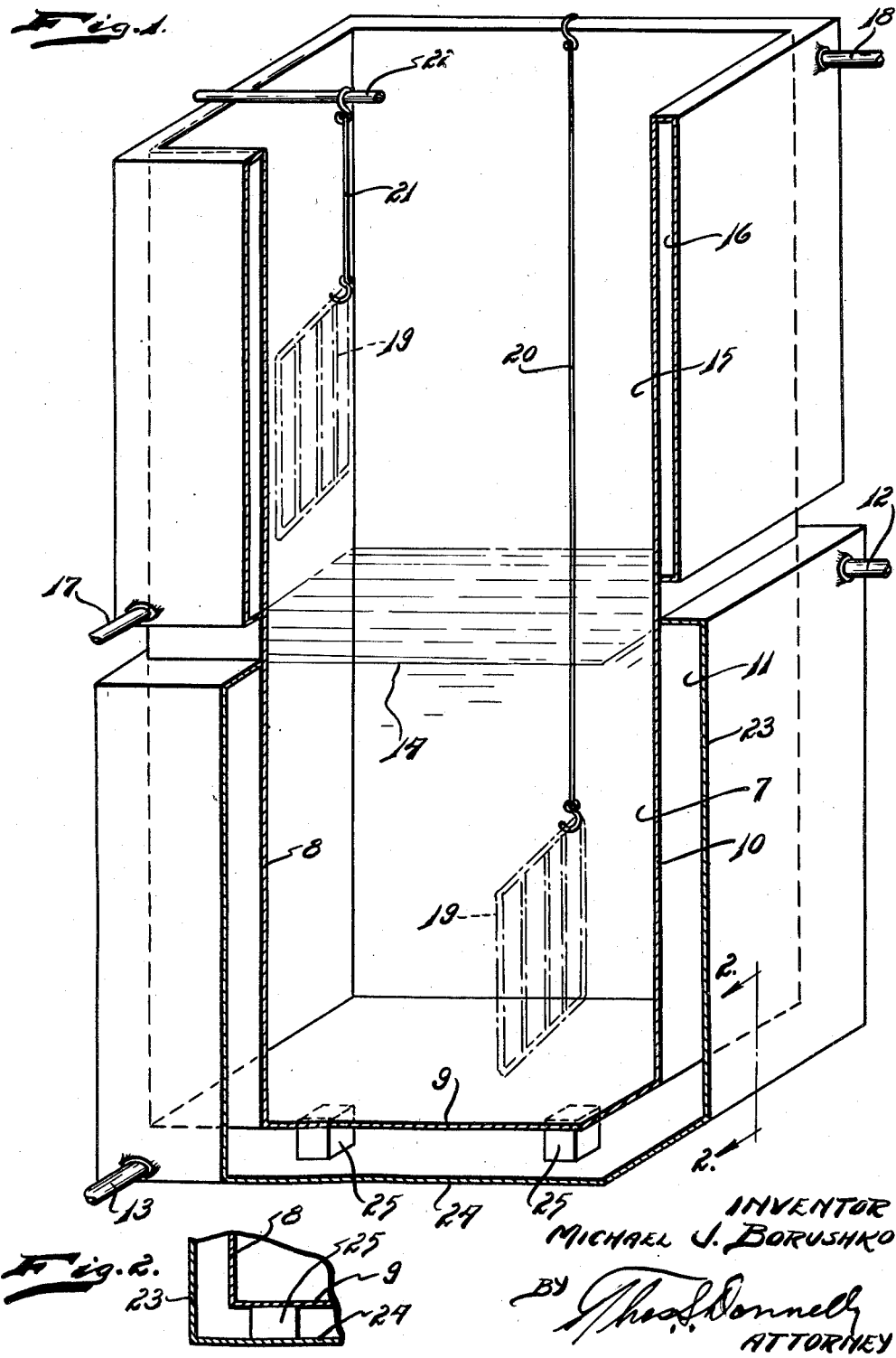

2,515,489

UNITED STATES PATENT OFFICE 2,515,489

COATING PROCESS

Michael J. Borushko, Detroit, Mich., assignor to Harding Manufacturing Company Incorporated, Detroit, Mich., a corporation of Michigan Application June 28, 1946, Serial No. 679,897

6 Claims. (Cl. 117—102)

My invention relates to a new and useful improvement in a coating process adapted for use in applying various types of coatings to various types of articles and particularly to metallic articles. The process is adapted for applying coatings of paints, varnishes, lacquers, enamels, wax coatings and so forth, which are all characterized as consisting of one or more suitable film forming components dissolved in one or more volatile solvents and which may also contain pigments or dyes and other useful additional agents such as driers or plasticizers.

Under present practice these materials are now applied to surfaces to be protected or decorated and the application is made by certain common techniques known variously as brushing on, spraying, dip coating and flow coating. Each of these methods has a certain field of usefulness and each has some disadvantages under other circumstances.

In general industrial practices an individual applying coatings by the aforementioned common methods is faced with the following situation:

To be effectively applied by the known methods the film forming components of the coating must be dissolved or dispersed in volatile solvents, and in some instances the volatile solvent will be present to the extent of over 80% of the weight of the coating as applied (for example: nitrocellulose lacquers, vinyl chloride-vinyl acetate copolymer lacquers, wax solutions, etc.). These solvents are generally flammable, explosive under certain conditions, expensive, and toxic. They must be removed from the coating after the wet film is applied and their removal generally involves difficult problems of ventilation and heating and safety and they contribute nothing to the useful properties of the coating and the solvents are lost upon their removal.

The present invention involves the use of a dip tank consisting of two elements, namely, 1. A lower section which holds the solution of the coating material to be applied and which is fitted with some means for heating, preferably by means of a steam jacket enclosing the sides and bottom;

2. An upper section which functions as a drying chamber and solvent vapor condenser and which is in reality an upward extension of the sides of the lower chamber to a height suitable for the work in hand. This upper section is surrounded by a jacket through which a cooling fluid (preferably cold water) is circulated.

In practice the solution of the coating material is placed in the lower chamber. Heat is applied and when the solution has attained a suitable temperature, which may generally be said to be a temperature near the boiling point of the solvent, the work to be coated is immersed in it and held there until it itself has become heated. It is then raised and held in the upper section, whereupon the heat contained within the workpiece causes the solvents to be driven out of the film, and the solvent vapors pass to the cold sides of the chamber where they are condensed and from which they flow back into the chamber below. Among the advantages of this process or method are:

1. It is unnecessary to provide separate baking facilities to drive the solvents out of the work and to dry the films. (Except that in some cases a supplementary bake may be necessary to develop further hardness in the film.)

2. The solvents are not lost or wasted but are, for the most part, recovered.

3. A high degree of safety from fire and explosion is attained and danger from possible toxic effects of the solvent is reduced to a low degree.

4. A minimum amount of equipment is required to carry on the process.

To avoid the disadvantages referred to and to attain the advantages mentioned, along with others which will appear in this specification, is an object of the present invention.

For the purposes of facilitating the explanation of the invention I have indicated one method, or apparatus, for carrying out the process in the drawings which form a part hereof and in which Fig. 1 is a cross sectional view of a tank used in carrying out the process, Fig. 2 is a fragmentary sectional view taken on line 2—2 of Fig. 1.

In the drawings I have illustrated a structure adapted for holding the coating solution and which may be said to consist of the lower compartment 7 and the upper compartment 15 although these are connecting and integral with each other. This container is composed of the side and end walls 7 and 10 and the bottom 9 and around the side wall 8 at the lower portion thereof is a chamber 11 connecting with which are the inlet and outlet pipes 12 and 13 for conducting steam or other heating fluid into the compartment 11, the wall 8 being surrounded by the outer wall 23 and the bottom being surrounded by the bottom 24 which is spaced therefrom by suitable spacing members 25. The upper compartment 15 is surrounded by the outer jacket which provides the chamber 16 communicating with which are the inlet and outlet pipes 17 and 18 through which cooling fluid may be delivered to the compartment 16 and I prefer to use cold water for this cooling medium. It will be noted that the compartment 16 terminates at its lower end slightly above the normal level 14 of the coating solution. This, of course, is not essential but is preferable.

In use, the workpiece 19 which it is desired to coat with the solution is immersed in the solution which is positioned in the compartment 7 and which is heated to a sufficiently high temperature. Experience has shown that generally if the temperature is raised to near the boiling point the most satisfactory results will be obtained, but satisfactory results may also be obtained at considerably lower temperature. The workpiece 19 is shown supported by the cable 20 but this is merely for the purposes of illustration. The workpiece is retained submerged in the coating solution sufficiently long to allow the workpiece to become heated and this period of immersion will extend from thirty seconds to ten minutes depending upon the size of the workpiece, the temperature of the solution or the volatility of the solvents. The workpiece need not always become heated to the temperature of the solution but it is generally desirable that it be so. When the workpiece has become heated it is then elevated into the chamber 15 and since the workpiece has been raised in temperature the contained heat in the workpiece will act as a vaporizer for vaporizing the solvents which are on the surface leaving the film of coating material on the workpiece. The temperature of the compartment 15 is, of course, considerably lower than the temperature in the compartment 7 and it is maintained at this low temperature, by the circulation of the cooling medium through the water jacket or cooling jacket of the upper chamber. When the workpiece is elevated it is hooked on the rod 22 and suspended by the cord 21. This, however, is merely another illustration of how a workpiece may be supported. The vapors which are driven off of the workpiece by the heat contained within the workpiece are rapidly condensed through striking against the cool walls of the compartment or chamber 15 and these condensed vapors are then permitted to flow downwardly and return to the coating solution which is contained in the compartment or section 7. In this way the solvents are recovered almost in their entirety so that the waste or loss of the solvents is thus avoided.

Experience has shown that the method described is one which is highly efficient in use and renders it possible to obtain an evenly applied coating and one which has a desired appearance. The operation is also one which may be quickly performed with a minimum amount of equipment.

In general I prefer to dissolve or disperse the film forming components of the coating compositions in a solvent of the class whose vapors are substantially heavier than air, such as trichlorethylene or perchlorethylene, although the process is applicable to a wide range of solvents and solutions.

Examples of protective coatings:

A. *Black Japan*

| | Parts |
|---|---|
| Gilsonite | 756 |
| Raw linseed oil | 185 |
| Trichlorethylene | 4000 |

B. *Wax solution*

| | Parts |
|---|---|
| Paraffin wax | 550 |
| Trichlorethylene | 4450 |

An example of a coating solution which may be used with this process when it is desired to deposit a stripable coating or to produce plastic film or foil by depositing the film on a suitable surface and then peeling off, is as follows:

| | Parts |
|---|---|
| Vinylite VYHH | 75 |
| Castor oil | 5 |
| Trichlorethylene | 225 |

Another example would consist of:

| | Parts |
|---|---|
| Ethyl cellulose—cps. viscosity | 75 |
| Trichlorethylene | 300 |
| Mineral oil | 3 |

The solids removed from the solution by the articles being coated are replaced by additions of a concentrate or paste of the film forming components at regular intervals of time during the operation so that the added solids are operated upon by the returned solvents.

What I claim as new is:

1. The method of applying a film-like coating to the surface of an article which comprises providing a body of a liquid composition including a volatile solvent and a film-forming material dispersed therein; maintaining said liquid at an elevated temperature approaching the boiling point of said solvent; condensing and returning to said liquid solvent vapor rising therefrom at said elevated temperature; immersing an article to be coated in said liquid for a time sufficient to raise the surface of said article substantially to the temperature of said liquid; thereafter raising said article above said vapor generated from said liquid and immediately disposing the article in an enclosed substantially vapor free chamber, the article then being hot and carrying an adhering layer of said hot liquid; said enclosed chamber being bounded by cooled side walls maintained at a solvent condensing temperature; retaining said article in said chamber while the heat content of said article causes rapid volatilization of the solvent content of said layer to leave said article coated with said film forming material, the solvent vapor liberated in said chamber from said layer being condensed at said side walls to maintain said enclosed chamber substantially free from solvent vapor; and recovering the resulting liquid solvent condensate.

2. The method of applying a film-like coating to the surface of an article which comprises providing a body of a liquid composition including a volatile solvent and a film-forming material dispersed therein; maintaining said liquid at an elevated temperature approaching the boiling point of said solvent; condensing and returning to said liquid solvent vapor rising therefrom at said elevated temperature; immersing an article to be coated in said liquid for a time sufficient to raise the surface of said article substantially to the temperature of said liquid; thereafter raising said article above said vapor generated from said liquid and immediately disposing the article in an enclosed substantially vapor free chamber, the article then being hot and carrying an adhering layer of said hot liquid; said enclosed chamber being bounded by cooled side walls maintained at a solvent condensing temperature; retaining said article in said chamber while the heat content of said article causes rapid volatilization of the solvent content of said layer to leave said article coated with said film forming material, the solvent vapor liberated in said chamber from said layer condensing at said side walls to maintain said enclosed chamber substantially free from solvent vapor; recovering the resulting liquid solvent condensate;

and replenishing the film forming material in said liquid composition as required after coating a number of said articles has reduced the content of said liquid composition of film forming material.

3. The method of applying a film-like coating to the surface of an article which comprises providing a body of a liquid composition including a volatile solvent and a film-forming material dispersed therein; maintaining said liquid at an elevated temperature approaching the boiling point of said solvent; condensing and returning to said liquid solvent vapor rising therefrom at said elevated temperature; immersing an article to be coated in said liquid for a time sufficient to raise the surface of said article substantially to the temperature of said liquid; thereafter raising said article above said vapor generated from said liquid and immediately disposing the article in an enclosed substantially vapor free chamber, the article then being hot and carrying an adhering layer of said hot liquid; said enclosed chamber being bounded by cooled side walls maintained at a solvent condensing temperature; retaining said article in said chamber while the heat content of said article causes rapid volatilization of the solvent content of said layer to leave said article coated with said film forming material, the solvent vapor liberated in said chamber from said layer condensing at said side walls to maintain said enclosed chamber substantially free from solvent vapor; recovering the resulting liquid solvent condensate; and removing said article from said enclosed chamber after said volatilization of the solvent content of said adhering layer.

4. The method of applying a film-like coating to the surface of an article which comprises providing a body of a liquid composition including a volatile solvent and a film-forming material dispersed therein; maintaining said liquid at an elevated temperature approaching the boiling point of said solvent; condensing and returning to said liquid solvent vapor rising therefrom at said elevated temperature; immersing an article to be coated in said liquid for a time sufficient to raise the surface of said article substantially to the temperature of said liquid; thereafter raising said article above said vapor generated from said liquid and immediately disposing the article in an enclosed substantially vapor free chamber, the article then being hot and carrying an adhering layer of said hot liquid; said enclosed chamber being bounded by cooled side walls maintained at a solvent condensing temperature; retaining said article in said chamber while the heat content of said article causes rapid volatilization of the solvent content of said layer to leave said article coated with said film forming material, the solvent vapor liberated in said chamber from said layer condensing at said side walls to maintain said enclosed chamber substantially free from solvent vapor; recovering the resulting liquid solvent condensate and returning the same to said body of liquid composition.

5. The method of applying a film-like coating to the surface of an article which comprises providing a body of a liquid composition including a volatile solvent and a film-forming material dispersed therein; maintaining said liquid at an elevated temperature approaching the boiling point of said solvent; condensing and returning to said liquid solvent vapor rising therefrom at said elevated temperature; immersing an article to be coated in said liquid for a time sufficient to raise the surface of said article substantially to the temperature of said liquid; thereafter raising said article above said vapor generated from said liquid and immediately disposing the article in an enclosed substantially vapor free chamber, the article then being hot and carrying an adhering layer of said hot liquid; said enclosed chamber being bounded by cooled side walls maintained at a solvent condensing temperature; retaining said article in said chamber while the heat content of said article causes rapid volatilization of the solvent content of said layer to leave said article coated with said film forming material, the solvent vapor liberated in said chamber from said layer condensing at said side walls to maintain said enclosed chamber substantially free from solvent vapor; recovering the resulting liquid solvent condensate; said enclosed chamber being disposed in the path of said solvent vapor rising from said liquid and said condensation of said rising vapor being effected on contact with the lower edge of said cooled chamber side walls.

6. The method of applying a film-like coating to the surface of an article which comprises providing a body of a liquid composition including a volatile solvent and a film-forming material dispersed therein; maintaining said liquid at an elevated temperature approaching the boiling point of said solvent; condensing and returning to said liquid solvent vapor rising therefrom at said elevated temperature; immersing an article to be coated in said liquid for a time sufficient to raise the surface of said article substantially to the temperature of said liquid; thereafter raising said article above said vapor generated from said liquid and immediately disposing the article in an enclosed substantially vapor free chamber, the article then being hot and carrying an adhering layer of said hot liquid; said enclosed chamber being bounded by cooled side walls maintained at a solvent condensing temperature; retaining said article in said chamber while the heat content of said article causes rapid volatilization of the solvent content of said layer to leave said article coated with said film forming material, the solvent vapor liberated in said chamber from said layer condensing at said side walls to maintain said enclosed chamber substantially free from solvent vapor; recovering the resulting liquid solvent condensate; said enclosed chamber being disposed in the path of said solvent vapor rising from said liquid and said condensation of said rising vapor being effected on contact with the lower edge of said cooled chamber side walls, the liquid condensates formed at said side walls being returned to said body of liquid.

MICHAEL J. BORUSHKO.

REFERENCES CITED

The following references are of record in the file of this patent:

UNITED STATES PATENTS

| Number | Name | Date |
|---|---|---|
| 1,429,288 | Lander | Sept. 19, 1922 |
| 2,235,825 | Cary | Mar. 25, 1941 |
| 2,346,101 | Bright | Apr. 4, 1944 |
| 2,350,743 | Fordyce | June 6, 1944 |